(12) United States Patent
Arkko et al.

(10) Patent No.: US 6,404,736 B1
(45) Date of Patent: Jun. 11, 2002

(54) CALL-ROUTING EFFICIENCY WITH A NETWORK ACCESS SERVER

(75) Inventors: Jari Arkko, Kauniainen; Seppo Arponen, Kirkkonummi, both of (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/096,627

(22) Filed: Jun. 12, 1998

Related U.S. Application Data

(60) Provisional application No. 60/050,325, filed on Jun. 20, 1997.

(51) Int. Cl.[7] .............................................. H04L 12/66
(52) U.S. Cl. ..................... 370/230; 370/360; 709/203; 709/223; 709/228
(58) Field of Search ................................ 370/230, 237, 370/360; 709/203, 223, 226, 228, 229

(56) References Cited

U.S. PATENT DOCUMENTS

| | | | |
|---|---|---|---|
| 4,700,340 A | | 10/1987 | Beranek et al. ............... 370/16 |
| 5,155,851 A | | 10/1992 | Krishnan .................... 395/650 |
| 5,546,379 A | | 8/1996 | Thaweethai et al. .......... 370/17 |
| 5,581,610 A | | 12/1996 | Hooshiari ................... 379/133 |
| 5,668,857 A | | 9/1997 | McHale .................... 379/93.07 |
| 5,898,780 A | * | 4/1999 | Liu ............................. 380/25 |
| 5,933,490 A | * | 8/1999 | White ........................ 370/221 |
| 6,011,910 A | * | 1/2000 | Chau ...................... 395/200.59 |
| 6,012,088 A | * | 1/2000 | Li ............................. 709/219 |
| 6,070,192 A | * | 5/2000 | Holt ........................... 709/227 |
| 6,073,176 A | * | 6/2000 | Baindur et al. ............. 709/227 |
| 6,084,892 A | * | 7/2000 | Benash ....................... 370/701 |
| 6,154,647 A | * | 11/2000 | Dahlin ........................ 455/426 |

FOREIGN PATENT DOCUMENTS

| | | |
|---|---|---|
| EP | 0 559 979 A2 | 9/1993 |
| EP | 0 828 367 A2 | 3/1998 |
| EP | RS 101380 US | 11/1998 |
| WO | WO 95/01063 | 1/1995 |
| WO | WO 97/50230 | 12/1997 |
| WO | WO 98/04088 | 1/1998 |
| WO | PCT/FI98/00539 | 10/1998 |

* cited by examiner

Primary Examiner—Alpus H. Hsu
Assistant Examiner—Roberta Stevens
(74) Attorney, Agent, or Firm—Jenkins & Gilchrist, P.C.

(57) ABSTRACT

A method and apparatus enables a Network Access Server together with a telecommunications switch to route incoming calls only to devices that have sufficient resources to provide a connection to the Internet. A set of devices, RPs, reformat incoming data from subscribers to a desired Internet Protocol. During operation, each RP performs self-checks to determine whether sufficient resources exist within the RP for providing Internet communication. An example of such a resource is an Internet protocol (IP) address pool. Each RP may have several IP address pools that are associated with individual Internet service providers (ISPs). If, for example, an individual ISP's IP address pool is depleted within a particular RP, then that RP signals as much to call routing logic. The call routing logic will not route calls for that individual ISP to that particular RP until the call routing logic receives another signal indicating that the depleted resource has been replenished.

32 Claims, 4 Drawing Sheets

CALL-ROUTING EFFICIENCY WITH A NETWORK ACCESS SERVER

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/050,325, filed Jun. 20, 1997.

BACKGROUND OF THE INVENTION

1. Technical Field of the Invention

The present invention relates in general to the telecommunications field, and in particular, to a method and system for implementing a Network Access Server (NAS) in association with a telecommunications switch.

2. Description of Related Art

Access to the Internet is increasingly desirable to achieve economic, educational, and communicative purposes. Individuals typically access the Internet from a personal electronic device such as a computer, personal digital assistant, or cellular phone. Subscribers in a public telephone network establish data connections to the Internet over an NAS. The data connections to an NAS are established over Plain Old Telephone Service (POTS) phone lines or Integrated Services Digital Network (ISDN) lines. At the subscriber end, normal POTS modems or ISDN network terminals (NT-Is, or network terminals on an ISDN connection) are used to initiate the communications. Personal computers with suitable communications software and hardware are frequently used as the terminal in conjunction with either a modem or NT-I.

The NAS acts as a router and concentrator for Internet Protocol (IP) packets that arrive via the data connections. The link level of the incoming data connections can also be terminated at the NAS. For analog lines, such as those originating with a POTS modem, modem pools may be provided at the NAS. IP packets are forwarded to an Internet gateway through various possible channels from the NAS. The IP packets are then transported over the Internet to the appropriate Internet destination.

In summary, an NAS accepts modem or ISDN calls to an Internet service provider (ISP), terminates the phone connection, and interprets the link layer protocol, e.g., Point to Point Protocol (PPP). The IP data packets are then forwarded to the Internet or possibly an intranet.

An NAS typically has an internal network for receiving and routing packets to the Internet. The internal network includes both electronic devices and one or more edge routers (e.g., an Internet Point-of-Presence, or INET-POP) The electronic devices are important for terminating the phone line connection and reformatting a subscriber's data to comport with the Internet protocol. In a conventional NAS, however, communication regarding resource availability is insufficient.

The electronic devices, for example, on the internal network can exhaust the supply of a given resource. Conventional electronic devices do not adequately convey such resource depletion to the logic responsible for routing incoming data communications to individual electronic devices. As a result, a subscriber's call may be routed to an electronic device that has exhausted all available resources, which may be required for Internet access. Consequently, the subscriber's attempt to access the Internet is abruptly truncated without explanation.

Such truncation is extremely annoying to the subscriber, who is unable to determine why the access attempt failed. The subscriber must redial and will (hopefully) be assigned an electronic device with adequate resources. Furthermore, this annoyance is exacerbated by customer-service concerns because the annoyance may cause the subscriber to cease attempting to access the Internet even when other electronic devices on the internal network have sufficient resources to facilitate Internet access.

In summary, conventional electronic devices and related apparatus do not (i) provide adequate information regarding resource availability to the routing logic in the NAS and associated telecommunications switch, or (ii) enable the routing logic to assign incoming calls only to electronic devices with sufficient resources for handling the incoming calls.

SUMMARY OF THE INVENTION

The present invention provides a method and apparatus for an NAS whereby resource depletion information is provided to call routing logic. The call routing logic is preferably software, hardware, firmware, or a combination thereof that attempts to provide communication throughput by directing incoming calls to a particular device of the NAS. As resources are depleted, the depletion(s) can be communicated to the call routing logic. Therefore, the call routing logic can avoid assigning incoming calls to devices with insufficient resources.

In a preferred embodiment, an NAS in association with a telecommunications switch includes a group of processing devices. The processing devices provide formatting changes for data being transmitted from the public telephone network to a private network such as the Internet, and vice versa. The processing devices are interconnected via an Ethernet network and include a router that is a gateway to the Internet.

Resource depletion messages are received at call routing logic from each processing device on the Ethernet network as resources are depleted. For example, if an IP address pool for a particular ISP is exhausted, a message so indicating is transmitted. Incoming calls can be routed away from the processing device with the depleted resource to ensure that public telephone network subscribers gain access to the Internet. When a resource is replenished, either by adding new resources or recapturing previously assigned resources, this information may also be forwarded to the call routing logic so that incoming calls may again be routed to the relevant processing device.

An important technical advantage of the present invention is that processing devices can send messages regarding resource depletion to call routing logic.

Another important technical advantage of the present invention is that call routing logic is enabled to assign incoming calls only to processing devices with sufficient resources to handle the incoming call.

Yet another important technical advantage of the present invention is that an NAS can prevent dial up subscribers from detecting resource depletion problems by routing their calls only to the devices with adequate resources.

Yet another important technical advantage of the present invention is that depletion of an IP address pool for an individual ISP is recognized and considered when making call routing decisions.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–5 of the drawings, like numerals being used for like and corresponding parts of the various drawings.

Figure 1:
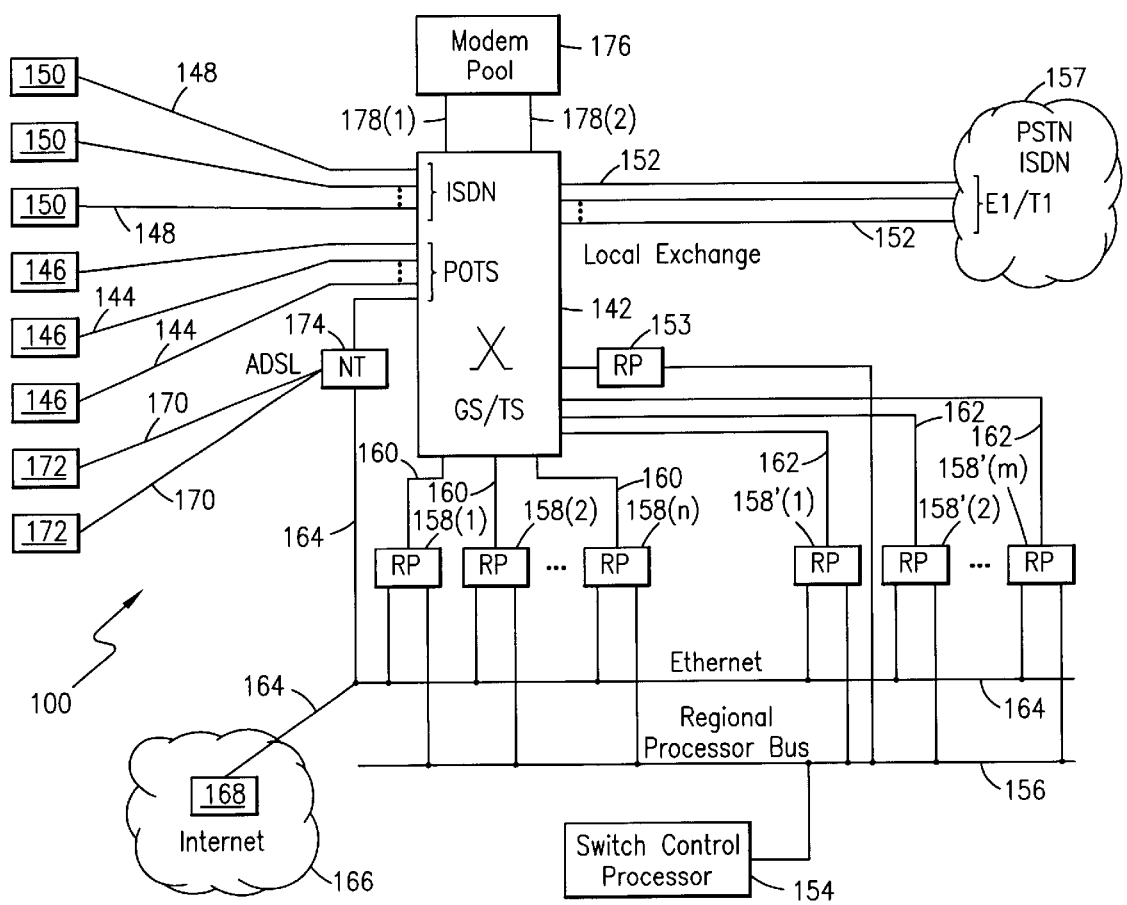
FIG. 1 illustrates a detailed diagram of a local exchange (LE) with an NAS which can be used to implement the present invention.

FIG. 1 illustrates a detailed diagram of a LE with an NAS which can be used to implement the present invention. The block diagram of a LE 100 includes an integrated NAS function. The LE 100 comprises a standard Ericsson AXE-type switch including a group switch/time switch (GS/TS) 142 which is connected to users 146 via a plurality of Plain Old Telephone Service (POTS) connection lines 144, as well as to users 150 via a plurality of ISDN 2B+D connection lines 148. The GS/TS 142 is further connected to a plurality of E1/T1 trunk connections 152 through which a communications interconnection is made to other LEs as well as to transit exchanges (TEs) over the Public Switched Telephone Network and/or ISDN (PSTN/ISDN) 157.

The GS/TS 142 of the LE 100 has a configuration and operation well known in the art for selectively interconnecting certain selected ones of the POTS connection lines 144 and/or ISDN connection lines 148 to certain selected ones of the E1/T1 trunk connections 152. Control over the operation of the GS/TS 142 in making the foregoing selected interconnections is effectuated by a regional processor (RP) 153 under the command of a central switch control processor (SCP) 154. A regional processor control bus 156 carries the signaling between the SCP 154 and the RP 153 necessary to control GS/TS 142 operation.

The LE 100 further includes a plurality of additional RPs used in providing the integrated access server functionality. A first plurality of the RPs 158 (1), 158 (2), . . . , 158(n) are connected via DL2 interface connections 160 to the GS/TS 142, and are connected to the SCP 154 via the regional processor control bus 156. Responsive to instructions issued by the SCP 154, data communications may be selectively connected (i.e., routed) between any one of the POTS connection lines 144 and/or ISDN connection lines 148 and the first plurality of the RPs 158(1), 158(2), . . . , 158(n).

A second plurality of the RPs 158'(1), 158'(2), . . . , 158'(m) are connected via DL2 interface connections 162 to the GS/TS 142, and are connected to the SCP 154 via the regional processor control bus 156. Similarly, responsive to instructions issued by the SCP 154, data communications may be selectively connected (i.e., routed) between any one of the E1/T1 trunk connections 152 and the second plurality of the RPs 158'(1), 158'(2), . . . , 158'(m).

The first plurality of the RPs 158(1), 158(2) 158(n) and the second plurality of the RPs 158'(1), 158'(2), . . . , . . . , 158'(m) are interconnected by an Ethernet link 164. Responsive to instructions issued by the SCP 154 and transmitted over the regional processor control bus 156, data communications may be selectively inserted into and extracted from the Ethernet link 164 by any of the first and second plurality of RPs 158 and 158'.

Using the Ethernet link 164, a direct connection is made from the LE 100 to the Internet 166 (perhaps through an Internet access point edge router 168). The Ethernet link 164 is further used to make a connection between the LE 100 and a plurality of asymmetric data subscriber line (ADSL) connection lines 170 to users 172. A network terminal (NT-A) 174, providing an ADSL termination, interfaces the plurality of ADSL connection lines 170 to the Ethernet link 164. The NT-A 174 also interfaces the lines 170 to the GS/TS 142 via one or more of the POTS connection lines 144. As the ADSL connection lines 170 carry both voice and data (sometimes simultaneously), the NT-A 174 functions to reroute the voice components of a call over the POTS connection lines 144 to the GS/TS 142, and reroute the data components of that call over the Ethernet link 164.

The first plurality of RPs 158(1), 158(2), . . . , 158(n) function to convert (e.g., format or frame) the actual user data communications between the data communications protocol required for transmission over the POTS connection lines 144 and/or ISDN connection lines 148 and the data communications protocol required for transmission over the Ethernet link 164. Conversely, the second plurality of the RPs 158'(1), 158'(2), . . . , 158'(m) function to convert (e.g., format or frame) the actual user data communications between the data communications protocol required for transmission over the Ethernet link 164 and the data communications protocol required for transmission over E1/T1 trunk connections 152.

The Ethernet link 164 functions to concentrate the packets of the data communications received from the POTS connection lines 144, ISDN connection lines 148, and/or ADSL connection lines 170 for GS/TS 142 routing and transmission over the E1/T1 trunk connections 152. Similarly, the Ethernet link 164 functions to concentrate the packets of the data communications received from the E1/T1 trunk connections 152 for GS/TS 142 routing and transmission over the POTS connection lines 144, ISDN connection lines 148, and/or ADSL connection lines 170.

The LE 100 still further includes a modem pool 176 implemented on a digital signal processing (DSP) platform and connected via DL2 interface connections 178(1) and 178(2) to the GS/TS 142. In particular, the modem pool 176 may be selectively connected by the GS/TS 142 (at the instruction of the SCP 154) through DL2 interface connection 178(1) to any one of the POTS connection lines 144. The modem pool 176 processes (e.g., modulates and de-modulates) data communications being transmitted to or received from users 146 over the POTS connection lines 144. The DL2 interface connection 178(2) and the DL2 interface connections 160 further enable the modem pool 176 to be selectively connected (in response to SCP 154 instruction) through the GS/TS 142 to the first plurality of RPs 158(1), 158(2), . . . , 158(n). This provides a route for data packet transmission between the POTS connection lines 144 and the Ethernet link 164.

The operation of the LE 100, which includes an integrated NAS functionality for supporting more efficient data communications, will now be described. In one mode of operation, the LE 100 supports efficient and direct user/subscriber data communications over a private data communications network such as the Internet 166 or possibly an intranet (not shown). In another mode of operation, the LE 100 supports efficient and direct user/subscriber data communications over a public data communications network such as the PSTN and/or ISDN 157 (concurrent with conventional voice communications). It should, of course, be understood that the LE 100 can simultaneously support such user/subscriber data communications over both the private and public networks in both modes of operation if necessary.

With respect to the former mode of operation relating to user/subscriber data communications over a private data communications network such as the Internet 166, consider first a data communication between a user 146 connected to one of the plurality of POTS connection lines 144 and the Internet 166. The data communication carried from the user 146 over the POTS connection line 144 comprises an analog data communication which is routed from the GS/TS 142 over the DL2 interface connection 178(1) to the modem pool 176, where it is de-modulated and output over the DL2 interface connection 178(2). The data communication is then routed back through the GS/TS 142 and over the DL2 interface connections 160 to the first plurality of RPs 158(1), 158(2), . . . , 158(n).

In the first:plurality of RPs 158, the protocol of the data communication is converted (e.g., de-framed) from the protocol required for transmission over the POTS connection line 144 (e.g., PPP or Serial Line Internet Protocol (SLIP)) to the protocol required for transmission over the Ethernet link 164 (e.g., Transmission Control Protocol/Internet Protocol (TCP/IP)). The protocol converted data communication is then output to the Ethernet link 164.

The Ethernet link 164 functions to concentrate the data communication with other data communications (from other users 146, as well as users 150 and 172) received from the first plurality of RPs 158 and the NT-A 174. The data communication is then sent over the Internet 166 through the Internet access point edge router 168. The first plurality of RPs 158 further perform a routing function in directing the data communications towards the proper Internet destinations.

Next, consider a data communication between a user 150 connected to one of the plurality of ISDN 2B+D connection lines 148 and the Internet 166. The data communication carried from the user 150 over the ISDN connection line 148 comprises a digital data communication, thus there is no need to route the communication through the modem pool 176. Rather, the digital data communication is directly routed from the GS/TS 142 over the DL2 interface connections 160 to the first plurality of RPs 158(1), 158(2), . . . , 158(n).

In the first plurality of RPs 158, the protocol of the data communication is converted (e.g., de-framed) from the protocol required for transmission over the ISDN connection line 148 (e.g., PPP or SLIP) to the protocol required for transmission over the Ethernet link 164 (e.g., TCP/IP). The protocol converted data communication is then output to the Ethernet link 164.

The Ethernet link 164 functions to concentrate the data communication with other data communications (from other users 150, as well as users 146 and 172) received from the first plurality of RPs 158 and the NT-A 174. The data communication is then sent over the Internet 166 through the Internet access point edge router 168. The first plurality of RPs 158 further perform a routing function in directing the data communications towards the proper Internet destinations.

Next, consider a data communication between a user 172 connected to one of the plurality of ADSL connection lines 170 and the Internet 166. The data communication at issue may be carried over the ADSL connection line 170 along with a voice communication. The NT-A 174 separates the data components from the voice components of the combined communication. The data components are then rerouted to the Ethernet link 164 already in the proper protocol (e.g., TCP/IP).

The Ethernet link 164 functions to concentrate the data communication with other data communications (from other users 172, as well as users 146 and 150) received from the first plurality of RPs 58 and the NT-A 74. The data communication is then sent over the Internet 166 through the Internet access point edge router 168. The first plurality of RPs 158 further perform a routing function in directing the data communications towards the proper Internet destinations.

Reverse processes occur with respect to data communications received from the Internet 166 for GS/TS 142 transmission to the users 146, 150, and 172. Thus, the Ethernet link 164 functions to concentrate the data communications received from the Internet 166 and the second plurality of RPs 158'. Furthermore, the first plurality of RPs 158 function to extract the data communications from the Ethernet link 164 and switch (e.g., frame) from the protocol required for transmission over the Ethernet link 164 (e.g., TCP/IP) to the protocol required for transmission over the POTS connection line 144 and ISDN connection line 148 (e.g, PPP or SLIP). The first plurality of RPs 158 and GS/TS 142 further perform a routing function in sending the data communications extracted from the Ethernet link 164 over the proper ones of the POTS connection lines 144, ISDN connection lines 148, or ADSL connection lines 170.

Figure 2:
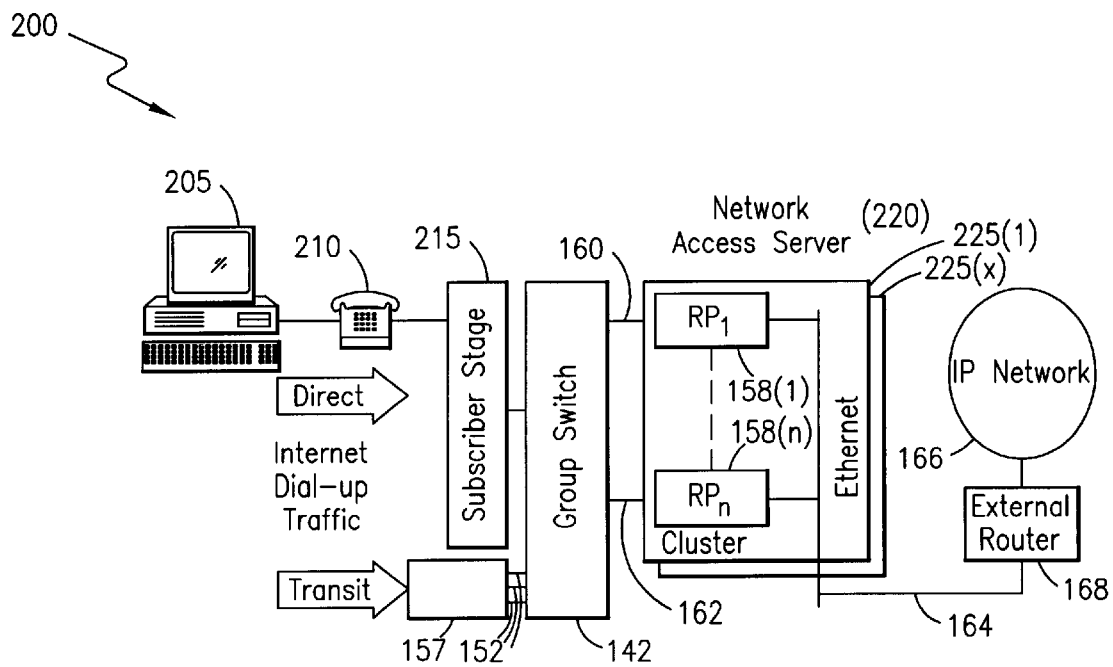
FIG. 2 illustrates a high-level diagram of a LE with an NAS which can be used to implement the present invention.

FIG. 2 illustrates a high-level diagram of a LE with an NAS which can be used to implement the present invention. A LE 200 provides a block-diagram view of the GS/TS 142, the NAS 220, and related communications equipment. A subscriber 205 (e.g., any of the users 146, 150, or 172 of FIG. 1) uses a terminal device 210 (e.g., a computer in conjunction with a modem or NT-I) to communicate over the subscriber stage 215 (e.g., connection lines 144, 148, or 170) directly with the GS/TS 142.

Also shown are transit communications over the PSTN/ISDN 157 over a plurality of E1/T1 trunk connections 152. It should be understood that incoming calls to the NAS 220 may arrive via the plurality of E1/T1 trunk connections 152. The NAS 220 is connected to the GS/TS 142 via DL2 interface connections 160 and 162. The NAS 220 is also connected to the Internet 166 (or some other private network such as a corporate intranet) via an external router 168 (e.g., an INET-POP, an edge router, or an Internet access point edge router) over an internal network. The NAS 220 also preferably performs authentication and accounting functions in connection with communications over the Internet 166.

This internal network of the NAS 220 can be governed by a variety of protocols and run at a myriad of speeds. The internal network is preferably, however, an Ethernet network 164. The Ethernet network 164 (or a plurality of Ethernet networks 164 linked by routers and/or gateways) interconnects clusters 225(1), . . . , 225(x). Each cluster 225 includes a plurality of RPs (RP$_1$ 158(1), . . . , RP$_n$ 158(n)).

The clusters (225(1), . . . , 225(x)) of devices (RPs 158) that are connected by the local Ethernet 164 terminate the phone calls from subscribers 205 and interpret the link layer protocols from the terminal devices 210. In an alternative embodiment, instead of the external router 168, another RP device (not specifically shown) forwards the traffic to the Internet via, for example, a Frame Relay operated on top of 2 Mb/s links back to the PSTN. In any event, the internal Ethernet network 164 is a preferred implementation to achieve the desired functions of the NAS 220.

Each RP 158 preferably has a set of 32 ports, although any number of ports can be within the spirit and scope of the invention. Each of the ports occupies one timeslot in the time-division multiplexed connection from the GS/TS 142, and each port is capable of handling one incoming call. It should be noted that a central processor (CP) (e.g., the SCP 154 of FIG. 1) supervises the behavior of the RPs 158 in the NAS 220. The CP preferably includes call routing logic (e.g., software, hardware, firmware, etc.) that decides which RP 158 will handle an incoming call. However, locating the call routing logic completely within the GS/TS 142, completely within the NAS 220, or distributed between the two, etc., are all embraced by the method and apparatus of the present invention.

Figure 3:
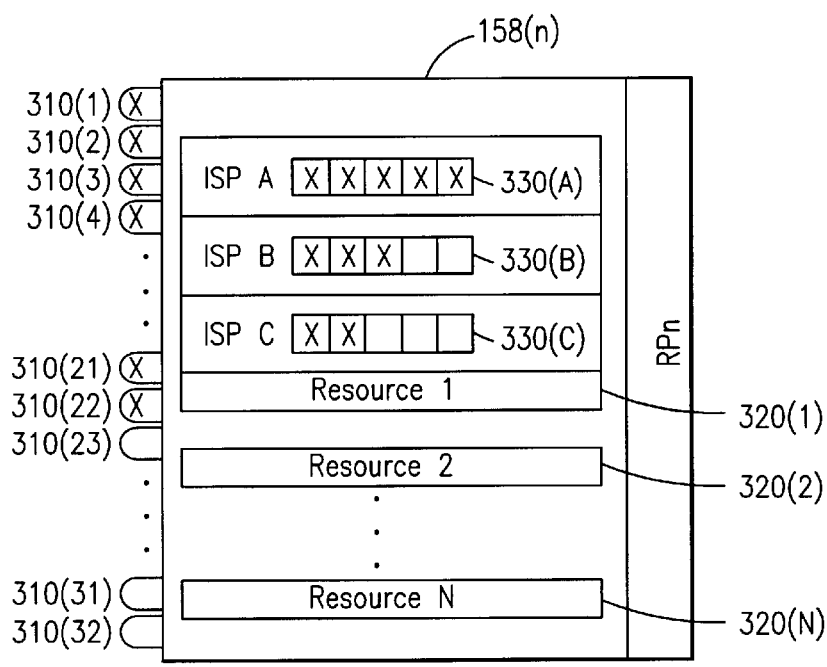
FIG. 3 illustrates a conceptual diagram of resource allocation among various entities within one processing device of an NAS.

FIG. 3 illustrates a conceptual diagram of resource allocation among various entities within one processing device of an NAS 220. The RP$_n$ 158(n) is shown with 32 exemplary ports 310(1), 310(2), . . . , 310 (32). As explained above, each port 310 is capable of handling one incoming call. An "X" within a port 310 denotes that the port element is currently in use. Hence, ports 310(1) through 310(22) are currently occupied. The RP$_n$ 158(n) is also shown to have multiple resources 320 (e.g., resources 320(1), 320(2), . . . , 320(N)).

The NAS 220 can preferably service multiple ISPs simultaneously. Consequently, the same ports 310 within the same RP 158 may be used for different ISPs at different times. The ISP is selected based on the phone number that dial-up users (e.g., subscribers 205) call, sometimes termed the B-number. Depending on the selection of a particular ISP, the user may be authenticated and billed with different mechanisms and/or servers. The packets of data transmitted by subscribers 205 may also be forwarded to different routers and links based on the particular ISP selected.

Continuing with FIG. 3, resource 320(1) is shown to be shared among various ISPs. ISP A, ISP B, and ISP C are specifically illustrated; however, other ISPs may also share the resource 320 (1). Resource 320 (1) is an exemplary resource of IP addresses. (This is not to imply that ISPs normally share defined IP address pools, much less individual IP addresses.) Each ISP has its own ISP address pool than can be assigned to its customers when they dial in. For example, each ISP has five IP addresses in its pool. ISP A has five IP addresses in its total IP address pool 330(A); ISP B has five IP addresses in its total IP address pool 330(B); and ISP C also has five IP addresses in its total IP address pool 330(C). Each ISP may have other than five IP addresses in its IP address pool, and each IP address pool need not have the same total number as every other IP address pool. As is designated by "X"s, IP address pool 330(A) has been completely depleted/exhausted, IP address pool 330(B) has been 60 percent depleted/exhausted, and IP address pool 330(C) has been 40 percent depleted/exhausted.

When a dial-up customer (e.g., a subscriber 205) attempts to access the IP network 166, the dial-up customer's ISP assigns the customer an IP address for use during the current communication session. Dial-up users need an IP address that will be associated with their computer before they can begin communicating with other computers/IP destinations on the IP network 166. An address from the customer's ISP's IP address pool 330 is reserved when the customer calls and is released when the call is disconnected.

Because an IP network 166 is unable to function with addresses dynamically changing location from one device to another, the IP address pool 330 of each ISP is specific to a certain device (e.g., a processing device such as the RP$_n$ 158(n)). Consequently, an ISP such as ISP A has a separate IP address pool 330 for each different RP 158 (in other words, ISP A has an IP address pool 330 for the RP$_1$ 158(1) that differs from the IP address pool 330(A) for the RP$_n$ 158(n)). As is indicated by resource 320(1) of the RP$_n$ 158(n), several ISPs may share one RP 158, and several ISPs may therefore have an IP address pool 330 for the same RP 158. It should be understood, however, that the IP addresses of the IP address pools 330 of two different ISPs are mutually exclusive (at least under current TCP/IP standards and current ISP business models). Advantageously, the present invention ensures that, for example, a dial-in call from a customer of ISP B will not be assigned to the RP$_n$ 158(n) unless ISP B's IP address pool 330(B) has at least one IP address available. Selection of an RP 158 is contingent upon IP address availability as well as port 310 availability.

Figure 4:
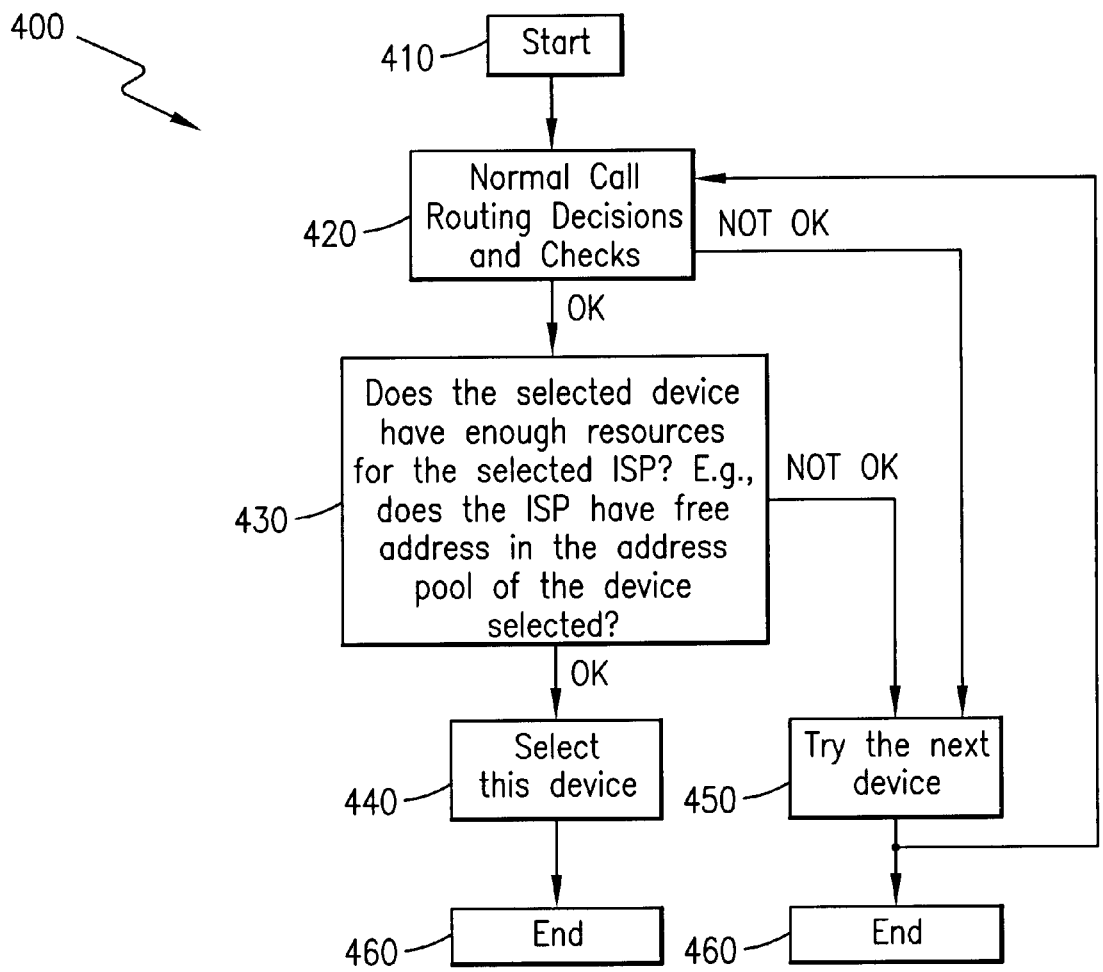
FIG. 4 illustrates in flowchart form a method of ensuring that a processing device to be selected has sufficient resources to be able to provide communication throughput to a private network according to one aspect of the present invention.

FIG. 4 illustrates in flowchart form a method of ensuring that a processing device to be selected has sufficient resources to be able to provide communication throughput to a private network, such as the Internet 166, according to one aspect of the present invention. As explained above, one example of a resource that may be depleted is IP addresses from an IP address pool 330. A dial-in subscriber's 205 ISP is determined based on the B-number called by the subscriber 205.

Flowchart 400 is composed of the call routing process making an additional check with respect to incoming calls. Providing the call routing logic (of the CP) with the RP 158 resource supply information enables the call routing logic to avoid routing subscriber 205 calls to the RPs 158 that cannot provide communication throughput due to the absence of one or more resources.

The call-analyzing process begins (at step 410). Normal call routing decisions and checks are performed (step 420). The phone network (e.g., GS/TS 142) routes incoming calls based on the called number (B-number). A customer of an ISP (e.g., ISP A) dials the B-number of the ISP A, and the call routing logic directs the connection only to the RPs 158 that are associated (either fully or in part) to the ISP A. It is also beneficial for the call routing logic to route incoming calls to the RPs 158 that have free ports 310 (e.g., ports 310(23), . . . , 310(32) in FIG. 3). In summary, the call routing logic (which is preferably part of the GS/TS 142 or another part of the telephone network system) selects (i) an NAS 220 and an RP 158 device that corresponds to the correct B-number (e.g., the ISP corresponding to the dialed B-number is associated with the selected device) and (ii) an RP 158 device that has ports 310 that are free.

Continuing with flowchart 400, if the normal call routing decisions and checks are "NOT OK", then the next device (e.g., the next RP 158) is tried (step 450). The attempt to establish a connection for the previous device ends (step 460), and the next device is tried by re-performing normal call routing decisions and checks on the next device (step 420 again). If the normal call routing decisions and checks are "OK", then the process may continue.

The process of flowchart 400 continues by determining whether the selected device (e.g., the selected RP 158) has sufficient resources for the selected ISP (step 430). For example, if the B-number called by subscriber 205 corresponds to ISP A, the call routing logic must determine whether ISP A has sufficient resources available to handle an incoming call at the selected device (e.g., the $RP_n$ 158(n)). The call routing logic determines that the IP address pool 330(A) for ISP A is depleted (at step 430). Hence, the result of the sufficient resources determination is "NOT OK" (in this example as illustrated in FIG. 3), and the next device (e.g., the next RP 158) is tried (step 450).

The attempt to establish a connection for the previous device ends (step 460), and the next device is tried by re-performing another set of determinations regarding whether the called ISP is associated with the next device, whether any ports 310 of the next device are free, and whether the called ISP has any IP addresses available in its IP address pool 330 (steps 420 and 430 again). If the results of both of these determinations (normal call routing decisions/checks and sufficient resources) are now "OK", then this most recently analyzed device is selected (step 440). The process can then end (step 460). Because the call routing logic that performs the process of flowchart 400 can be part of the GS/TS 142, calls from subscribers 205 will not be routed to devices that cannot provide a connection to the Internet 166.

It should be noted that the resource confirmation checks (of step 430) can refer to more than IP address availability. The method and apparatus of the present invention apply equally well to any resource that can be exhausted before all ports 310 are in use. Furthermore, the resource confirmation checks may apply to the RP 158 as a whole, instead of only to an individual ISP.

Figure 5:
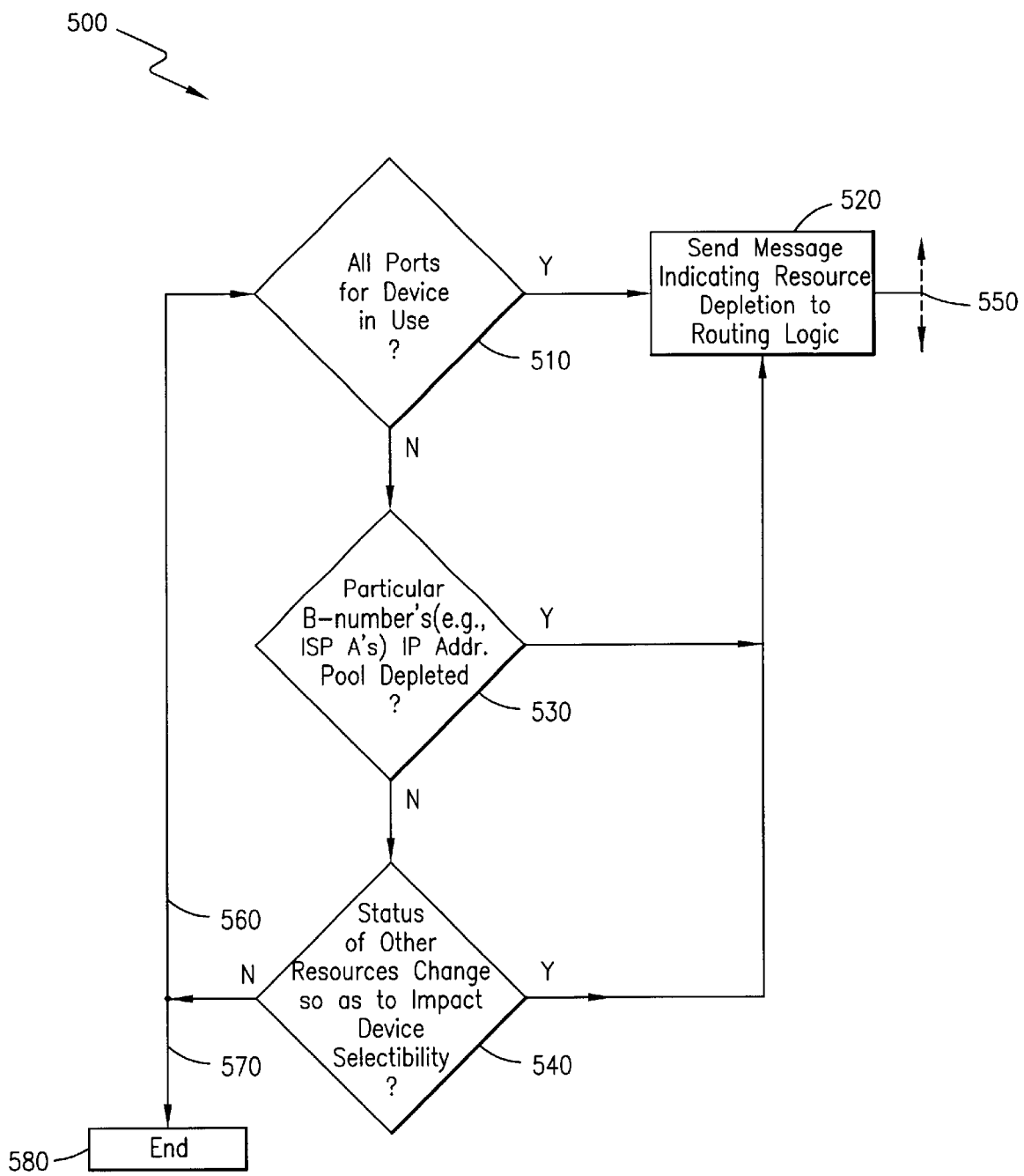
FIG. 5 illustrates in flowchart form a method for ensuring that routing logic receives resource allocation information according to another aspect of the present invention.

FIG. 5 illustrates in flowchart form a method for ensuring that routing logic receives resource allocation information according to another aspect of the present invention. In order for the call routing logic, which is preferably located in the CP of the telecommunications switch, to ensure that an RP 158 has sufficient resources to handle an incoming call, the RPs 158 may send messages to the call routing logic whenever a resource is depleted.

The flowchart 500 of FIG. 5 represents a process that each RP 158 preferably undergoes at regular intervals in order to make timely and relevant message transmissions to the call routing logic regarding the status of resources. The resources may be, for example, either those whose absence would be merely deleterious to establishing or maintaining quality connections to the Internet 166 or those whose absence would fully prevent the establishment or maintenance of connections to the Internet 166. The flowchart 500 begins with a determination of whether all ports 310 in a given RP 158 (e.g., the $RP_n$ 158(n)) are currently in use (step 510).

When all ports in the $RP_n$ 158(n) are in use, then a message indicating that all ports are occupied is sent to the call routing logic (step 520). It should be noted that a "message" is only an exemplary format for providing the information, but any type of signaling is within the spirit and scope of the present invention. Preferably, the signaling is continuous or repetitive at regular intervals that are sufficiently frequent so as to prevent incoming call assignment to RPs 158 that do not have sufficient resources. Returning to the port occupancy determination (step 510), according to the condition illustrated in FIG. 3 for the $RP_n$ 158(n), ports 310(23), . . . , 310(32) are available so the result is "No". The $RP_n$ 158(n) next determines whether the particular B-number (which corresponds to a particular ISP, for example ISP A) dialed by the subscriber 205 has any IP address(es) remaining or whether the IP address pool 330(A) is depleted (step 530).

Because the IP address pool 330(A) is depleted, a message is sent to the call routing logic that indicates that the IP address pool 330(A) is depleted (step 520). Advantageously, this enables the call routing logic to avoid selecting the $RP_n$ 158(n) even though (i) ISP A is associated with the $RP_n$ 158(n) and (ii) some of the ports 310 are free on the $RP_n$ 158(n). Despite these two factors, ISP A cannot accept any more incoming calls to the $RP_n$ 158 (n). ISP A may, however, be able to accept incoming calls to other RPs 158, and the call routing logic will try such other RPs 158 in accordance with the method of FIG. 4 (especially steps 430 and 450). The dial-in subscriber 205 may therefore be able to connect to the Internet 166 on the first attempt and not be subjected to an annoying, inexplicable disconnection.

The method of flowchart 500 also enables the call routing logic to stratify call routing decisions as finely as an individual ISP, as explained above in the context of IP address pools. In other words, the call routing logic will continue to assign incoming calls directed to ISP B or ISP C to the $RP_n$ 158(n) until a resource (such as IP address pools 330(B) or 330(C), respectively) that is needed by the given ISP is depleted. Arrow 550 represents the direction of flow after a resource depletion message is transmitted to the call routing logic (step 520). The direction of arrow 550 depends on the resource depleted. If the depleted resource is the ports 310, then additional checks need not necessarily be made until at least one port 310 becomes available. Hence, arrow 550 can represent the directing of the process back to the port-in-use determination (step 510). If the depleted resource is the IP address pool 330 of an individual ISP, then other calls can still be assigned to the $RP_n$ 158(n) and therefore additional checks are preferably executed. Hence, arrow 550 can represent the directing of the process to additional checks (step 540) after determining that an IP address pool 330 is depleted.

The $RP_n$ 158(n) continues checking the status of other resources that can impact whether the $RP_n$ 158(n) should be selected by the call routing logic (step 540). The checking of other resources (step 540) also occurs directly after a determination that no IP address pools are depleted (e.g., a "No" at step 530). As stated above, these resources can be, for example, such that their absence (i) hinders a connection, (ii) prevents a connection, (iii) impacts all possible connections, and/or (iv) impacts the connections of only a certain ISP. If such a resource is determined to be depleted, then the call routing logic is signaled (step 520). If not, then after all relevant resources have been checked, the occupancy of the ports 310 are again checked (step 510) via arrow 560.

It should be noted that other orders for checking the status of resources and informing the call routing logic of discovered depletion conditions can be alternately used (i.e., the steps 510–540 may be rearranged without departing from the spirit and scope of the present invention). Furthermore, when a (formerly-depleted) resource becomes available again, either by the addition of new resources to the $RP_n$ 158(n) or by the relinquishment of an existing, previously-occupied resource, a message so indicating is similarly transmitted to the call routing logic. This signaling enables the call routing logic to again select the RP$_n$ 158(n) for incoming calls (e.g., to the ISP A when a customer hangs up and therefore frees up an IP address from the IP address pool 330(A)).

FIG. 5 has been primarily explained above in the context of a method that each RP$_n$ 158(n) undergoes either constantly or at regular intervals in order to provide the call routing logic with resource status update messages. Alternatively, the method of flowchart 500 represents steps undertaken in response to a notification at the call routing logic of an incoming call being received. As a consequence of receiving the incoming call, the call routing logic interrogates the RP$_n$ 158(n). In other words, the flowchart 500 may be executed in response to steps 420 and 430 (of FIG. 4) instead of at predefined intervals or in reaction to a sudden resource depletion.

In this context, the flowchart 500 (instead of proceeding via arrow 560) can proceed via arrow 570 to the end of the method (step 580). Such an end to the method preferably includes the transmission by the RP$_n$ 158(n) of a no-depletion status message to the call routing logic as a reply to the interrogation. Additionally, at the first determination of a depletion condition of a necessary resource (e.g., an IP address pool at step 530), flowchart 500 may proceed from the step 520 directly to the end of the method (step 580) via the arrow 550. Other possible modifications will be evident to one of ordinary skill in the art after reading and understanding the principles of the present invention.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving call-routing efficiency for a telecommunications switch that is associated with a network access server, comprising the steps of:

receiving at call routing logic a request for connecting a first call to a network;

receiving at said call routing logic at least one resource status indicator from said network access server;

selecting a first processing device for call assignment consideration for said first call;

determining whether said first processing device has a depleted resource, said depleted resource being a resource other than a plurality of ports of said first processing device; and if so, trying a second processing device.

2. The method of claim 1, further comprising the step of:

if not, selecting said first processing device for said first call.

3. The method of claim 1, further comprising the step. of:

receiving at said call routing logic at least one signal indicating a resource depletion status in said first processing device.

4. The method of claim 3, further comprising the step of:

transmitting from said first processing device to said call routing logic said at least one signal indicating said resource depletion status.

5. The method of claim 1, wherein said depleted resource is at least one Internet protocol address pool.

6. The method of claim 5, further comprising the steps of:

ascertaining a first B-number of said first call;

ascertaining a first Internet service provider that corresponds to said first B-number; and wherein said step of determining further comprises the step of determining whether a first Internet protocol address pool corresponding to said first Internet service provider in said first processing device is depleted.

7. The method of claim 1, wherein said depleted resource is any resource that can be depleted before all of said plurality of ports of said first processing device are depleted.

8. The method of claim 1, wherein said network is the Internet.

9. A method for improving call-routing efficiency for a telecommunications switch that is associated with a network access server, comprising the steps of:

receiving at call routing logic a request for connecting a first call to a network;

selecting a first processing device for call assignment consideration for said first call;

determining whether said first processing device has a depleted resource, said depleted resource being a resource other than a plurality of ports of said first processing device;

if so, trying a second processing device; and further comprising the steps of:

checking at intervals for resource depletion by substantially all of a plurality of processing devices in said network access server; and providing at least one depletion signal to said call routing logic from each of said plurality of processing devices that detects resource depletion during said step of checking, said at least one depletion signal indicating which resource is depleted.

10. A method for improving call-routing efficiency for a telecommunications switch that is associated with a network access server, comprising the steps of:

receiving at call routing logic a request for connecting a first call to a network;

selecting a first processing device for call assignment consideration for said first call;

determining whether said first processing device has a depleted resource, said depleted resource being a resource other than a plurality of ports of said first processing device;

if so, trying a second processing device; and further comprising the step of:

providing at least one non-depletion signal to said call routing logic from at least one of a plurality of processing devices in said network access server when a previously-depleted resource is no longer depleted.

11. The method of claim 10, wherein said step of selecting a first processing device for call assignment consideration for said first call further comprises the step of:

selecting said first processing device based on a B-number of said first call and port availability of said first processing device.

12. The method of claim 10, wherein said step of determining whether said first processing device has a depleted resource further comprises the step of:

checking said first processing device for said depleted resource after said first call is received.

13. The method of claim 12, wherein said step of checking said first processing device for said depleted resource after said first call is received further comprises the step of:

interrogating, by said call routing logic, said first processing device.

14. A method for improving call-routing efficiency for a telecommunications switch that is associated with a network access server, comprising the steps of:
receiving a request for connecting a first call to a network;
ascertaining a first B-number of said first call;
ascertaining a first Internet service provider that corresponds to said first B-number;
determining a first processing device that has at least one free port and is associated with said first Internet service provider;
sending, from said first processing device, a resource status indicator for a first Internet protocol address pool corresponding to said first Internet service provider;
determining whether said first Internet protocol address pool corresponding to said first Internet service provider at said first processing device is depleted responsive to said resource status indicator; and
if so, trying a second processing device.

15. The method of claim 14, further comprising the step of:
if not, selecting said first processing device for said first call.

16. The method of claim 14, wherein the steps of sending and determining further comprises the steps of:
sending, from said first processing device, said resource status indicator indicating that said first Internet protocol address pool corresponding to said first Internet service provider is depleted; and
wherein said step of determining whether said first Internet protocol address pool corresponding to said first Internet service provider at said first processing device is depleted determines that said first Internet protocol address pool is depleted.

17. The method of claim 16, wherein said step of sending a signal indicating that said first Internet protocol address pool corresponding to said first Internet service provider is depleted occurs in response to an interrogation of said first processing device, said interrogation being in response to said request for connecting said first call.

18. The method of claim 16, wherein said step of sending a signal indicating that said first Internet protocol address pool corresponding to said first Internet service provider is depleted occurs in response to an affirmative result from at least one of a plurality of periodic depletion evaluations at said first processing device.

19. The method of claim 14, wherein the steps of sending and determining further comprise the steps of:
sending, from said first processing device, said resource status indicator indicating that said first Internet protocol address pool corresponding to said first Internet service provider is at least partially replenished; and
wherein said step of determining whether said first Internet protocol address pool corresponding to said first Internet service provider at said first processing device is depleted determines that said first Internet protocol address pool is not depleted.

20. A node in a telecommunications network that improves call-routing efficiency, said node comprising:
a telecommunications switch connected to a plurality of telecommunications network subscribers, said telecommunications switch further comprising call routing logic;
a network access server connected to said telecommunications switch, said network access server further comprising a plurality of processing devices, said plurality of processing devices providing communications with a private network, said network access server further comprising a plurality of resources for providing said communications with said private network, said network access server generating a resource status indicator of said plurality of resources to said call routing logic of said telecommunications switch; and
wherein a call from a subscriber from among said plurality of telecommunications network subscribers is routed by said call routing logic to a first processing device from among said plurality of processing devices if said first processing device has sufficient resources from among said plurality of resources responsive to said resource status indicator to provide communication with said private network to said subscriber.

21. A node in a telecommunications network that improves call-routing efficiency, said node comprising:
a telecommunications switch connected to a plurality of telecommunications network subscribers, said telecommunications switch further comprising call routing logic;
a network access server connected to said telecommunications switch, said network access server further comprising a plurality of processing devices, said plurality of processing devices providing communications with a private network, said network access server generating at least one resource status indicator for at least one of said plurality of processing devices;
wherein a call from a subscriber from among said plurality of telecommunications network subscribers is routed by said call routing logic to a first processing device from among said plurality of processing devices if said first processing device has sufficient resources to provide communication with said private network to said subscriber; and
wherein said call routing logic receives said at least one resource status indicator indicating that said first processing device does not have sufficient resources to provide communication with said private network to said subscriber.

22. The node of claim 21, wherein said first processing device transmits to said call routing logic said at least one signal indicating that said first processing device does not have sufficient resources to provide communication with said private network to said subscriber.

23. The node of claim 22, wherein said first processing device transmits to said call routing logic said at least one signal indicating that said first processing device does not have sufficient resources to provide communication with said private network to said subscriber in response to an interrogation of said first processing device, said interrogation being in response to said call from said subscriber.

24. The node of claim 22, wherein said first processing device transmits to said call routing logic said at least one signal indicating that said first processing device does not have sufficient resources to provide communication with said private network to said subscriber in response to an affirmative result from at least one of a plurality of periodic depletion evaluations at said first processing device.

25. The node of claim 20, wherein at least one of said plurality of resources is at least one Internet protocol address pool.

26. The node of claim 25, wherein:
said call routing logic ascertains a B-number of said call and an Internet service provider that corresponds to said B-number; and said call routing logic only routes said call to said first processing device if an Internet protocol address pool of said Internet service provider at said first processing device has at least one available Internet protocol address.

27. The node of claim 20, wherein a first subset of said plurality of resources are comprised of any resource that can be depleted before all of a plurality of ports of said first processing device are depleted.

28. The node of claim 20, wherein said private network is the Internet.

29. A node in a telecommunications network that improves call-routing efficiency, said node comprising:
- a telecommunications switch connected to a plurality of telecommunications network subscribers, said telecommunications switch further comprising call routing logic;
- a network access server connected to said telecommunications switch, said network access server further comprising a plurality of processing devices, said plurality of processing devices providing communications with a private network;
- wherein a call from a subscriber from among said plurality of telecommunications network subscribers is routed by said call routing logic to a first processing device from among said plurality of processing devices if said first processing device has sufficient resources to provide communication with said private network to said subscriber; and
- wherein substantially all of said plurality of processing devices check for resource depletion at intervals, and each of said plurality of processing devices that discovers a depleted resource when so checking provides at least one depletion signal to said call routing logic, said at least one depletion signal indicating which resource is depleted.

30. A node in a telecommunications network that improves call-routing efficiency, said node comprising:
- a telecommunications switch connected to a plurality of telecommunications network subscribers, said telecommunications switch further comprising call routing logic;
- a network access server connected to said telecommunications switch, said network access server further comprising a plurality of processing devices, said plurality of processing devices providing communications with a private network;
- wherein a call from a subscriber from among said plurality of telecommunications network subscribers is routed by said call routing logic to a first processing device from among said plurality of processing devices if said first processing device has sufficient resources to provide communication with said private network to said subscriber; and
- wherein at least one of said plurality of processing devices provides at least one non-depletion signal to said call routing logic when a previously-depleted resource is no longer depleted.

31. The node of claim 20, wherein calls are initially routed based on a B-number of said call and port availability of said plurality of processing devices before considering resource availability in said plurality of processing devices.

32. An arrangement for improving call-routing efficiency for a telecommunications switch that is associated with a network access server, comprising:
- means for receiving at call routing logic means a request for connecting a first call to a network;
- means for receiving at said call routing logic means at least one resource status indication from said network access server;
- means for selecting a first processing device of said network access server for call assignment consideration for said first call;
- means for determining whether said first processing device has a depleted resource, said depleted resource being a resource other than a plurality of ports of said first processing device;
- means for trying a second processing device if said means for determining determines that said first processing device has a depleted resource; and
- means for selecting said first processing device for said first call if said means for determining does not determine that said first processing device has a depleted resource.

* * * * *